R. H. TUCKER.
AIR LIFT.
APPLICATION FILED SEPT. 18, 1920.
1,434,800.
Patented Nov. 7, 1922.
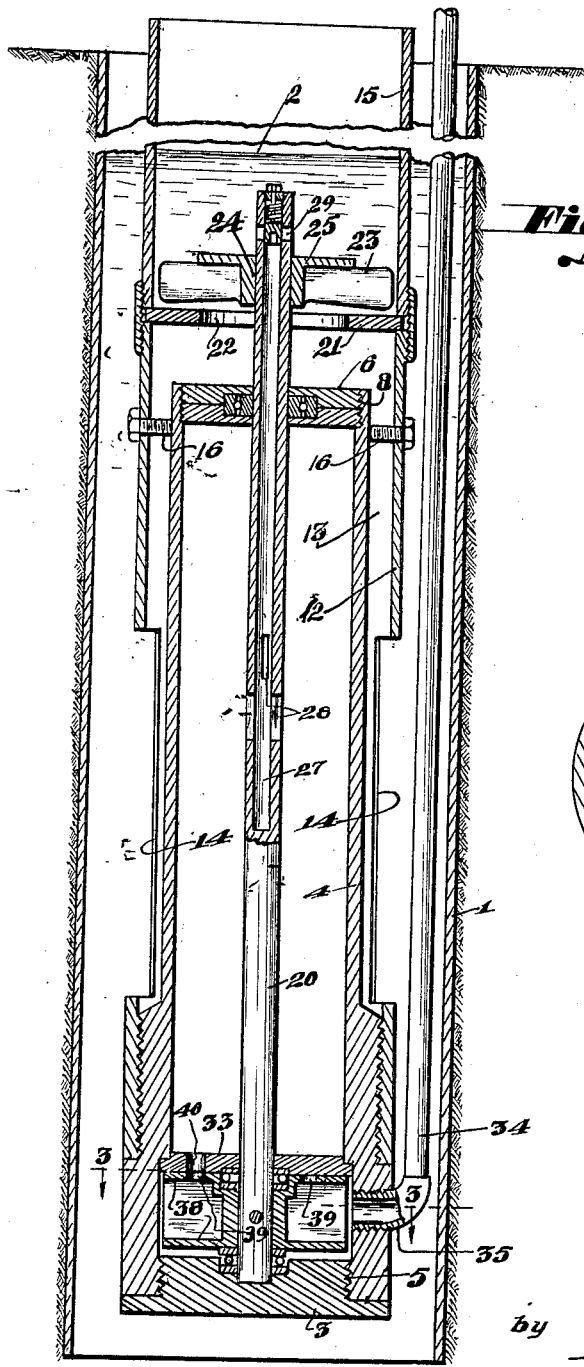
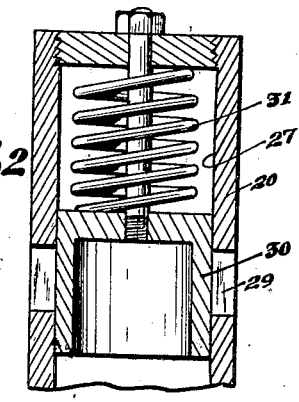
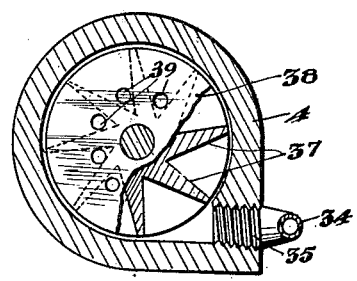
INVENTOR
Ralph H. Tucker
by Hazard & Miller
Att'ys Patented Nov. 7, 1922.

1,434,800

UNITED STATES PATENT OFFICE.

RALPH H. TUCKER, OF LOS ANGELES, CALIFORNIA.

AIR LIFT.

Application filed September 18, 1920. Serial No. 411,201.

*To all whom it may concern:*

Be it known that I, RALPH H. TUCKER, a citizen of the United States, residing at Los Angeles, in the county of Los Angeles and State of California, have invented new and useful Improvements in Air Lifts, of which the following is a specification.

This invention relates to certain improvements in air lifts as described and claimed in my Patent No. 1,365,210, issued January 11, 1921.

It is the object of the present invention to provide for the discharge of the air beyond the impeller for raising the liquid, said discharge being provided with a check valve for preventing the return of the muck in the well to the casing of the apparatus when the same is not in use.

It is a further object of the invention to provide an improved impeller for rotating the shaft of the apparatus by means of which a more efficient action is obtained and all of the air employed for rotating said impeller will be discharged to the casing of the apparatus.

It is a still further object of the invention to provide an improved arrangement of the impeller for raising the liquid whereby churning of the same is prevented at the start of the operation of the device.

The invention will be readily understood from the following description of the accompanying drawings, in which Figure 1 is a longitudinal section through a construction made in accordance with the invention.

Fig. 2 is a detail longitudinal section through the check valve for the air discharge.

Fig. 3 is a transverse section on the line 3—3 of Fig. 1.

The well in which the improved air lift is arranged to be sunk is shown at 1, the liquid level therein being shown at 2. The improved air lift comprises a base 3 sunk to the bottom of the well 1 and having a cylindrical casing 4 projecting upwardly therefrom. The cylindrical casing may be detachably connected to the base 3 as by the screw threaded connection 5. A cap 6 is arranged at the upper end of casing 4 and may be secured thereon by the screw threaded connection 8.

A casing 12, preferably, surrounds casing 4 in spaced relation therefrom, this latter casing being shown as mounted upon the lower portion of casing 4 which for this purpose is of somewhat greater diameter in order to provide the space 13 between casings 4 and 12. The sides of casing 12 are suitably slotted as shown at 14 to permit of the ready intake of the liquid within the well into the space between the casings and into the chamber at the upper end of casing 12.

A casing 15 may be threaded on to the upper end of casing 12 through which casing the liquid lifted by an impeller within the same is arranged to be raised. The casing 15 may extend to any desired height, preferably, to the surface level. Suitable positioning bolts 16 may be threaded through the walls of casing 12 so as to abut against the walls of casing 4 for concentrically positioning the latter casing within the casing 12.

The liquid impelling mechanism of the improved lift comprises a shaft 20 journaled at its lower end in the base 3 and projecting upwardly therefrom through the casing 4 and outwardly through a suitable opening in cap 6, and thence through casing 12 and into casing 15.

A transverse baffle 21 is, preferably, provided between casings 12 and 15, and said baffle is provided with an axial opening 22 surrounding shaft 20 projecting upwardly through the same. An impeller 23 is fixed upon shaft 20 above baffle 21 with the central portion of said impeller in alinement with the axial opening 22. The hub 24 of the impeller is provided with a radially extending flange 25 beyond the blades of the impeller and in axial alinement with opening 22.

By this arrangement when the impeller is rotated by the rotation of the shaft, churning of the fluid raised by the impeller will be prevented, since the fluid will be elevated through axial opening 22 and will then be caused to flow outwardly around baffle flange 25 and thence upwardly.

The shaft 20, preferably, extends beyond baffle flange 25 and is provided with a hollow bore 27 communicating with casing 12 through the slots 28. At the upper end of the shaft this bore communicates with slots 29 in order to permit of the discharge of air through said bore and slots to the casing 15. When the mechanism is not in use a check valve 30 reciprocates within the bore 27 at the slots 29 so as to open or close the same. The check valve is yieldably held in closed position by means of a spring 31 which is arranged to give when the check valve is subjected to the pressure of the air in bore 27 so as to open the check valve.

The means for rotating shaft 20 comprises a turbine fixed upon the shaft and received within an air chamber to which compressed air is supplied for causing rotation of the turbine and shaft. As an instance of this arrangement a partition 33 may be arranged in casing 12 above the base 3 and an air supply pipe 34 is arranged to communicate with the side of the space thus provided through a discharge nipple 35 extending through the wall of casing 12. The turbine received within the air chamber thus formed includes blades 37 having their contact surfaces radially disposed with relation to shaft 20 so that the air entering through nipple 35 will impact perpendicularly against said blades. Plates 38 are received over the ends of the blades and ports 39 are provided in the upper of said plates so as to communicate with the respective spaces between adjacent blades of the turbine. A co-operating port 40 is provided in plate 33 in such position as to be alined with the successive ports 39.

By the arrangement as thus set forth it will be seen that the air acting upon the blades 37 will be subsequently discharged through alined ports 39 and 40 to the casing 12, and from thence will pass through slots 28 to the bore of shaft 20, and from thence through slots 29 into the head of liquid which is being lifted by impeller 23.

Various changes may be made without departing from the spirit of the invention as claimed.

What is claimed is:

Liquid propelling means including a shaft, a motor chamber, a rotor upon the shaft within said chamber, an impeller upon said shaft beyond said chamber, said rotor including radially disposed blades and end plates covering the same, one of said end plates having discharge ports at the spaces between adjacent blades, and said motor chamber having a discharge port arranged for alinement with successive ones of the first mentioned ports.

In testimony whereof I have signed my name to this specification.

RALPH H. TUCKER.